UNITED STATES PATENT OFFICE.

FRIEDRICH AUGUST VOLKMAR KLOPFER, OF LEUBNITZ, NEAR DRESDEN, GERMANY.

PROCESS FOR OBTAINING STARCH AND GLUTEN FROM WHEAT-FLOUR.

No. 929,861.      Specification of Letters Patent.      Patented Aug. 3, 1909.

Application filed April 4, 1907. Serial No. 366,277.

*To all whom it may concern:*

Be it known that I, FRIEDRICH AUGUST VOLKMAR KLOPFER, a subject of the King of Saxony, and resident of Dohnaerstrasse 64, Leubnitz, near Dresden, Kingdom of Saxony, German Empire, have invented a new and useful Process for Obtaining Starch and Gluten from Wheat-Flour, of which the following is a specification.

The present invention relates to a process for obtaining starch and gluten from wheat-flour and consists in mixing the wheat-flour with water stirring it to a uniform pulp and at the same time adding chlorid of sodium to the wheat-flour in small quantities up to 1 per cent. for the purpose of not dissolving the gluten cellular texture but only of loosening the structure of the same to such a degree that when treating the wheat-flour mixed with water containing chlorid of sodium in a centrifuging separator a separation of the big-grained starch from the gluten-pulp containing the gluten, the so called gluten-starch and the greater part of the extractive substances of the wheat-flour, will be obtained. Thus it is intended to effect a separation of the big-grained prima starch, the gluten-starch being obtained separately, as the gluten-pulp resulting on centrifugal treatment is separated by lixiviation into gluten-starch and insoluble gluten after removing the wheat-flour extract. This separate extraction of the gluten-starch is necessary if it is intended to produce the best qualities of wheat-starch. The so obtained gluten-pulp is, after lixiviation, a tough viscous rubber-like wheat-gluten which can be used for the manufacture of numerous foods, because of being free from strange ingredients and at the same time possessing the original baking-qualities. The gluten-pulp obtained according to the present invention will easily be, as already stated above, separated into a wheat-flour extract which is removed and a viscous gluten-pulp containing the gluten-starch and the insoluble gluten, as the gluten is not obtained in a dissolved state but as a viscous mass. The wheat-flour extract thus contains, as no splitting off of the lecithin from the albumin and no destruction of the ferments of the wheat-flour has taken place, the albumen soluble in water and the soluble carbohydrates found in the wheat-flour.

If according to the present invention the wheat-flour has been mixed with water by stirring it, while adding chlorid of sodium, the stirred wheat-flour pulp will be treated in a closed centrifuging separator for the purpose of separating the wheat starch from the gluten-pulp. The addition of chlorid of sodium shows from a food chemist's point of view the great advantage, that, as regards the taste, the chlorid of sodium is absolutely perfect and will help to preserve the gluten pulp as well as the wheat-flour extract, this fact being of great importance in such cases where these substances cannot be treated further immediately after they have been obtained.

What I claim is:

A process for separating large grained and valuable starch from the albumen pulp containing the small grained starch, the entire albumen, the soluble carbohydrates and the soluble salts, which consists in adding to the water while stirring it together with the wheat flour to be centrifuged, chlorid of sodium in such small quantities up to one per cent. so that the gluten cellular texture is not dissolved, but only its structure loosened, whereby after the mixture is finally treated in a separator, the gluten, the starch and a wheat flour extract containing the extractive wheat flour substances soluble in water are obtained without destroying the lecithin bound to the albumen and the ferments of the flour.

In testimony, that I claim the foregoing as my invention, I have signed my name in presence of two witnesses, this 25th day of March 1907.

FRIEDRICH AUGUST VOLKMAR KLOPFER.

Witnesses:
    PAUL ARRAS,
    CLARE SIMON.